United States Patent

[11] 3,587,233

| [72] | Inventor | Alfred Fischbach<br>Runderoth/Bezirk Cologne, Germany |
|------|----------|---|
| [21] | Appl. No. | 813,245 |
| [22] | Filed | Apr. 3, 1969 |
| [45] | Patented | June 28, 1971 |
| [32] | Priority | Apr. 5, 1968, Jan. 28, 1969 |
| [33] | | Germany |
| [31] | | P 17 78 198.5 and P 19 04 037.0 |

[54] METHOD AND APPARATUS FOR MAINTAINING THE PRESSURE AT A HYDRAULIC ACCUMULATOR
10 Claims, 3 Drawing Figs.

[52] U.S. Cl. .................................................. 60/51, 60/52, 91/20
[51] Int. Cl. ...................................................... F15b 1/02
[50] Field of Search ......................................... 60/51, (E), 57, 52 (H.F), 52 (H.D), 52 (B); 91/20

[56] References Cited
UNITED STATES PATENTS

| 2,132,325 | 10/1938 | Soldatti ........................ | 60/52X |
| 2,231,331 | 2/1941 | Griffith et al. ................ | 60/51UX |
| 2,275,963 | 3/1942 | Herman et al. ................ | 60/51UX |
| 2,399,294 | 4/1946 | Ray .............................. | 60/52B |
| 2,641,106 | 6/1953 | Jelinek ......................... | 60/51 |
| 2,679,854 | 6/1954 | Stevenson .................... | 60/51X |
| 2,803,110 | 8/1957 | Chittenden................... | 60/EUX |

*Primary Examiner*—Edgar W. Geoghegan
*Attorney*—Michael S. Striker

ABSTRACT: A source of pressure fluid is connected with a hydraulic accumulator to maintain the pressure required for pressure consuming operations of a hydraulically driven machine part. The flow of fluid from the source, such as a pump, to the accumulator is controlled depending on the operations of the machine part.

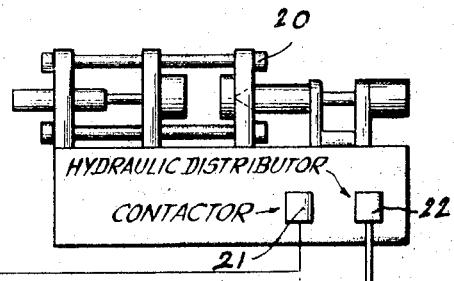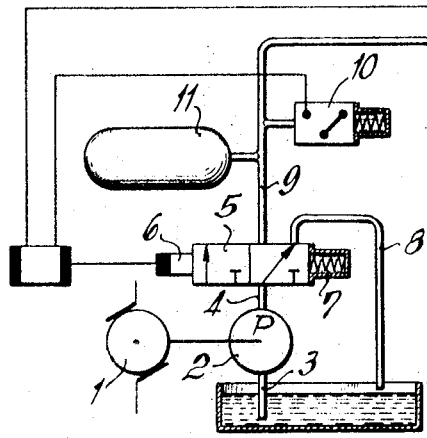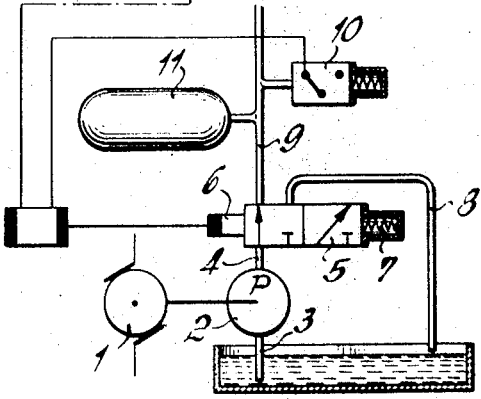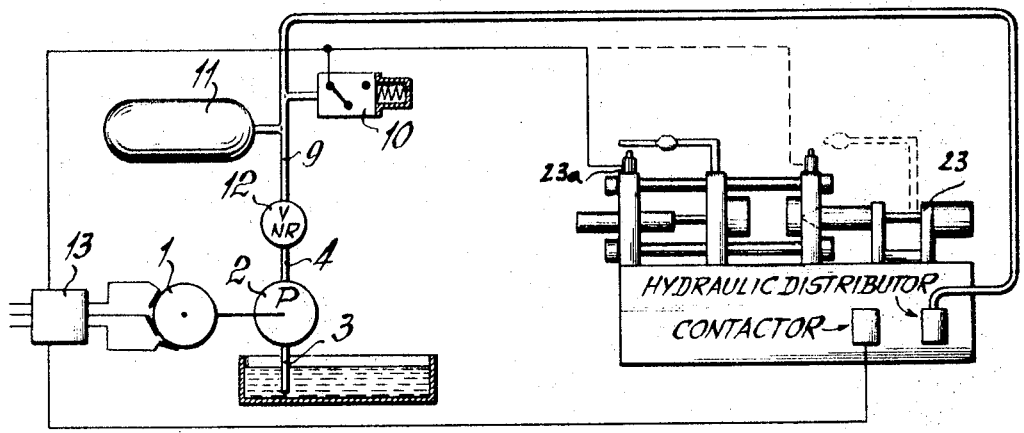
INVENTOR
ALFRED FISCHBACH

METHOD AND APPARATUS FOR MAINTAINING THE PRESSURE AT A HYDRAULIC ACCUMULATOR

BACKGROUND OF THE INVENTION

Hydraulically driven machines are known, for example injection molding machines for synthetic plastics, particularly thermoplastic materials. Machines of this type require a hydraulic accumulator for maintaining a substantially constant pressure, and when the pressure in the accumulator drops, it is connected with a pressure source until the pressure in the accumulator is sufficiently increased, whereupon the pressure source is disconnected. If the pressure source is a pump, it may be set to idle circulation.

In accordance with the prior art, the connection of the pressure source with the accumulator is carried out depending on the pressure fluctuations. This arrangement has a disadvantage, inasmuch as a pressure difference of about 14 percent is required for actuating a hydraulically operated valve which means that the pressure source is connected with the accumulator only after a pressure crop of 14 percent. A pressure drop of this magnitude is undesired for controlling the operations of a machine, and furthermore the shifting of the valve, and the connection of the pressure source with the accumulator, takes place at moments which are entirely independent of the operations of the machine, so that the pressure source may be connected with the accumulator, or disconnected from the same, at moments of the machine operation during which such change is unfavorable. Furthermore, the valve requires a fluid for the shifting operations, and the amount of fluid required for the shifting of the valve is frequently a substantial part of the entire amount of fluid required for the operation of the machine.

SUMMARY OF THE INVENTION

It is one object of the invention to overcome the disadvantages of the prior art, and to provide a method and apparatus for supplying pressure fluid at a substantially constant pressure to a machine.

Another object of the invention is to provide a method and apparatus in which the pressure source is connected and disconnected from a hydraulic accumulator dependent on the rhythm of the machine operations, and under consideration of the pressure required by the same.

In accordance with the invention, the start of the supply of pressure fluid from the pressure source to the accumulator depends on the actual sequence of operations of the machine, and is selected to have the best effect for the machine operations. As a result, very uniform pressure is obtained during any phase of the operation of the hydraulic motor driving the machine, and during each operation of the same. The method of the invention comprises the steps of supplying at a selected moment of an operation of a machine, and under control of the same, pressure fluid to an accumulator connected with the machine for maintaining a predetermined fluid pressure in the machine during an operation, and terminating under the control of the machine, the flow of pressure fluid to the accumulator at another moment of the operation.

A pressure control apparatus according to the invention comprises an accumulator connected with a conduit of the machine; a source of pressure fluid, such as a motor driven pump; operating means actuated by the machine at a selected moment of an operation to effect flow of fluid from the pump to the accumulator; and pressure responsive control means responsive to a selected pressure in the same to terminate the flow of pressure fluid.

In one embodiment of the invention, which is particularly suitable for machines requiring high power, for example 4 kw., of the motor driven pump serving as pressure source, the operating means include a valve which connects the pump with the accumulator, or disconnects the pump from the same. In accordance with the invention, at the beginning, or at a selected moment during each operation of the machine, and depending on the progress of the operation, the pump is connected by the valve with the accumulator, and disconnected from the same when a selected maximal pressure is obtained. The moment of the connection of the pump with the accumulator can be selected depending on the actual sequence of operations of the machine, and in such manner as is best for obtaining perfect operations of the same. A substantially constant pressure is obtained in any position of the pressure fluid consuming devices of the machine, and during each operation of the same.

For example, if the machine is an injection molding machine provided with a hydraulic motor, the otherwise required pressure reducing valve for the injection stroke can be omitted, which is an advantage. The arrangement can be such that the pressure reducing valve is connected or disconnected by a simple switching operation.

When the method of the invention is used, high pressure is available at the beginning of the injection stroke, and continuously decreases to the end of the injection stroke. Any loss of energy due to pressure reduction is avoided. When a selected final pressure is reached, the pump is disconnected from the accumulator, or shifted by the valve to idle circulation.

In this embodiment of the invention, pressure responsive control means sense the pressure in a conduit connecting the accumulator with the hydraulic drive means of the machine. When a selected pressure is reached, the pressure responsive control means shift the valve to a position in which the pump circulates idly. Since only a valve and a pressure responsive element is required, the construction is extremely simple. The valve can be shifted under control of switching means already provided in the machine, or by additional switching means controlled by moving parts of the machine to effect shifting of the valve to the position in which the pump supplies pressure fluid to the accumulator.

It is preferred to operate the valve by an electromagnetic means for shifting the valve to the position connecting the pump with the accumulator, and to provide spring means for returning the valve to the idling position. The circuit of the electromagnetic means includes a holding contact which is opened when the operation of the machine has progressed to that the valve has again to be shifted to the idling position. Due to the provision of electromagnetic actuation means for the valve, no hydraulic fluid is required for operating the same. Due to the provision of the holding contact, an impulse given by the pressure responsive control means for opening the holding contact, results in the shifting of the valve to the circulating position by the spring.

For motor driven pumps of lesser power, for example below 4 kw., another embodiment of the invention in which the pump is started and stopped, is particularly advantageous. At a selected moment of the machine operation, the motor of the pump is started and pressure fluid is supplied to the accumulator, and at another moment of the machine operation, or under the control of a pressure responsive means, the motor of the pump is cut off so that no pressure fluid is supplied to the accumulator. In this construction, a shifting valve is not necessary, but it is advantageous to provide a check valve in the conduit connecting the pump with the accumulator so that the stopped pump is hydraulically disconnected from the accumulator.

In this embodiment, a signal is produced by a switch operated by a moving part of the machine, and controls an electromagnetic means by which switching means of the motor are actuated. In this manner, the motor can be started and stopped entirely depending on the machine operations which results in a particularly simple construction. However, it is also possible to provide a pressure responsive means sensing the pressure in the conduit leading from the accumulator to the machine, and to cause switching off of the pump motor at a selected pressure sensed by the pressure responsive control means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a fragmentary schematic view illustrating a first embodiment of the invention in a condition in which no fluid is supplied to the accumulator;

FIG. 2 is a fragmentary schematic view illustrating the embodiment of FIG. 1 in another condition in which fluid is supplied to the accumulator; and FIG. 3 is a fragmentary schematic view illustrating a second embodiment of the invention.

DESCRIPTION OF THE PREFERRED EMBODIMENTS

Referring first to the embodiment of FIGS. 1 and 2, an electromotor 1 drives a pump 2 which is a source of pressure fluid. The fluid is pumped from a sump through a pump inlet conduit 3 and discharged from an outlet conduit 4 which is connected with a valve 5. An electromagnetic actuating means 6 is connected with valve 5 and shifts the same, when energized, to the position of FIG. 2 against the action of a spring 7. When electromagnetic actuating means 6 is deenergized, spring 7 shifts valve 5 from the position of FIG. 2 to the position of FIG. 1. A conduit 9 connects the valve housing with a hydraulic accumulator 11, a pressure responsive control means 10, and with the hydraulic motor of the machine, for example an injection molding machine 20. The pressure responsive control means 10 is connected with conduit 9 intermediate accumulator 11 and the machine.

Motor 1 is continuously driven and continuously drives the pump 2 so that pressure fluid is pumped from the sump through conduits 3 and 4 and enters valve 5. In the position of FIG. 1, electromagnetic actuating means 6 is not energized, so that valve 5 is in a position for connecting conduit 4 with conduit 8 which leads to the sump so that pump 2 idly circulates the fluid. The parts of the machine which are hydraulically operated by fluid in conduit 9 receive required pressure fluid from accumulator 11.

At the beginning, or at the selected moment of a pressure consuming operation of a fluid-operated part of the machine, a contact relay 21 is excited to operate its contact by which electromagnetic actuating means 6 is energized so that valve 5 is shifted from the disconnecting position of FIG. 1 to the connecting position of FIG. 2 in which a valve conduit connects conduit 4 with conduit 9 so that pressure fluid is supplied to the distributor 22 of the machine 20, and to the accumulator 11 for maintaining the pressure in conduit 9 during the pressure consuming operation.

The energization of the electromagnetic operating means is effected by an impulse produced by switching means, not shown, which are required for the operation of the machine, for example by timing switches for the return movement of the injection piston of the injection molding machine.

When a selected pressure, set on the pressure responsive control means 10, is reached in conduit 9, the pressure responsive control means 10 produces an impulse so that relay 21 shifts the holding contact of electromagnetic actuating means 6 so that the same is deenergized and spring 7 can shift valve 5 back to the position of FIG. 1. The fluid pumped by pump 2 is circulated until electromagnetic actuating means 6 is energized again under the control of a part of the machine.

A pushbutton may be provided for operating the relay 21 of the electromagnetic actuating means 6 during adjusting of the machine, or the relay may be operated by a pushbutton already provided in the machine.

In the embodiment of FIG. 3, an electromotor 1 drives pump 2 so that pressure fluid is pumped from the sump 3 into the outlet conduit 4, through a check valve 12, and into conduit 9 which is first connected with accumulator 11, then with the pressure responsive control means 10, and finally with the distributor of the machine.

A switching means 13 is connected into the circuit of the motor 1, and has a first position in which the motor is energized and drives pump 2, and a second position in which the motor 1 is deenergized, and pump 2 is at a standstill.

Switching means 13 is actuated depending on the sequence of operations of the machine 23. During each working stroke of the machine, switching means 13 energizes motor 1, and pressure fluid is pumped through check valve 12 and conduit 9 into accumulator 11 and to the fluid consuming parts of the machine. When sufficient pressure is produced in accumulator 11, either the pressure responsive control means 10, or other means 23a controlled by the moving parts of the machine, effect shifting of switching means 13 so that pump motor 1 is disconnected and pump 2 stops. Instead of a multiple valve as described with reference to the embodiment of FIGS. 1 and 2, a simple check valve 12 is provided, and by the use of the switching means, a simple but efficient pressure fluid control can be obtained.

It will be understood that each of the elements described above, or two or more together, may also find a useful application in other types of pressure control arrangements for machines operated by pressure fluid differing from the types described above.

While the invention has been illustrated and described as embodied in a method and apparatus for controlling the pressure in a hydraulic accumulator depending on the operations of a machine whose hydraulic motor is connected with the accumulator, it is not intended to be limited to the details shown, since various modifications and structural changes may be made without departing in any way from the spirit of the present invention.

I claim:

1. Method of maintaining the pressure at a movable fluid operated part performing pressure consuming operations in a hydraulically operated machine; comprising the steps of supplying at a selected moment of the pressure consuming operation of said movable part, pressure fluid to an accumulator which is hydraulically connected with said movable fluid operated part so that a predetermined pressure is maintained at said accumulator and at said part during said pressure consuming operation; and terminating under the control of said machine the flow of pressure fluid to said accumulator at another selected moment of said operation when the pressure provided by said accumulator is sufficient for said machine after said other selected moment.

2. The method of claim 1 comprising sensing the pressure at said accumulator and said part; and terminating automatically the flow of fluid to said accumulator when a selected pressure is sensed.

3. The method of claim 1 wherein said selected moment is the beginning of the pressure consuming operation.

4. Pressure maintaining apparatus for a hydraulic machine having a movable part operated by pressure fluid to perform pressure consuming operations, comprising, in combination, a conduit for supplying fluid to said part of said machine; a pressure accumulator hydraulically connected with said conduit; a source of pressure fluid; operating means actuated by said machine at a selected moment of a pressure consuming operation of said part to effect flow of fluid from said source to said accumulator and said conduit whereby to maintain a predetermined pressure at said accumulator and at said part of said machine during said pressure consuming operation; and pressure responsive control means connected with said conduit and responsive to a selected maximum pressure in the same to terminate the flow of pressure fluid from said source to said accumulator and said conduit.

5. Pressure maintaining apparatus as claimed in claim 4 wherein said operating means include valve means between said source and said conduit and having a connecting and a disconnecting position, and actuating means actuated by said machine at said selected moment of said operation to move said valve means to said connecting position so that fluid from said source flows to said accumulator and said conduit; and wherein said pressure responsive control means effects movement of said valve means to said disconnecting position.

6. Pressure control apparatus as claimed in claim 5 wherein said actuating means include electromagnetic means energized by said machine at said selected moment for moving said valve means to said connecting position, and spring means operatively connected with said valve means for moving the same to said disconnecting position; and wherein said pressure responsive control means is connected with said electromagnetic means for deenergizing the same so that said spring means move said valve means to said disconnecting position.

7. Pressure control apparatus as claimed in claim 4 wherein said source includes a motor, and a pump driven by said motor and having a discharge outlet; comprising a connecting conduit means connecting said discharge outlet with said accumulator and conduit; and wherein said operating means include switching means for said motor actuated by said machine at said moment of said operation so that said pump is driven and supplies fluid to said accumulator and said conduit of said machine during said operation; and wherein said pressure responsive control means is connected with said switching means for operating the same to stop said motor and said pump.

8. Pressure control apparatus as claimed in claim 7 comprising a check valve in said connecting conduit means open to flow of fluid from said pump to said accumulator and conduit, and closing said connecting conduit means when said pump stops and discharges no fluid into said connecting conduit.

9. The method of claim 2 wherein said flow of fluid is produced by a pump; and wherein said pump is stopped when a selected maximum pressure is sensed.

10. The method of claim 2 wherein said flow of fluid is blocked when a selected maximum pressure is sensed.